United States Patent
Oel et al.

(10) Patent No.: US 9,126,590 B2
(45) Date of Patent: Sep. 8, 2015

(54) METHOD FOR ADAPTING A CLUTCH

(71) Applicant: Dr. Ing. h.c.F. Porsche Aktiengesellschaft, Stuttgart (DE)

(72) Inventors: Markus Oel, Lippstadt (DE); Jörg-Michael Birkhold, Gerlingen (DE); Nils Sauvlet, Rutesheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/865,871

(22) Filed: Apr. 18, 2013

(65) Prior Publication Data

US 2013/0282217 A1    Oct. 24, 2013

(30) Foreign Application Priority Data

Apr. 19, 2012    (DE) .......................... 10 2012 103 408

(51) Int. Cl.
*B60W 20/00* (2006.01)
*B60W 10/02* (2006.01)
*F16D 48/06* (2006.01)

(52) U.S. Cl.
CPC ............... *B60W 20/40* (2013.01); *F16D 48/06* (2013.01); *B60W 10/02* (2013.01); *Y10S 903/902* (2013.01)

(58) Field of Classification Search
None
See application file for complete search history.

(56) References Cited

U.S. PATENT DOCUMENTS

| | | | | |
|---|---|---|---|---|
| 2,209,385 | A * | 7/1940 | Burtnett | 475/261 |
| 3,269,200 | A * | 8/1966 | Vanghn et al. | 474/35 |
| 3,605,507 | A * | 9/1971 | Ishihara et al. | 475/120 |
| 2005/0130800 | A1* | 6/2005 | Rieger et al. | 477/174 |
| 2010/0101913 | A1 | 4/2010 | Schuler et al. | |
| 2012/0312080 | A1 | 12/2012 | Klymenko et al. | |

FOREIGN PATENT DOCUMENTS

| | | |
|---|---|---|
| DE | 10 2007 003 902 | 7/2008 |
| DE | 10 2009 027 907 | 1/2011 |
| DE | 10 2009 055 161 | 6/2011 |
| DE | 10 2010 039 401 | 2/2012 |

OTHER PUBLICATIONS

Translation of DE 102007003902 and DE 102009055161 A1 from EPO online translation.*
Machine English translation of DE 102007003902 A1 performed from google patents.*
German Search Report of Oct. 5, 2012.

* cited by examiner

*Primary Examiner* — John R Olszewski
*Assistant Examiner* — Nicholas K Wiltey
(74) *Attorney, Agent, or Firm* — Gerald E. Hespos; Michael J. Porco; Matthew T. Hespos

(57) ABSTRACT

A method is provided for adapting the torque that can be transmitted by a clutch of a motor vehicle that has an internal combustion engine and an electric motor for driving. A pressure medium activation device is driven by an actuator and has a pressure medium link between a master cylinder and a slave cylinder for activating the clutch. An adaptation of the torque that can be transmitted by the clutch takes place in a disengaged clutch position and a change in the actuator position a given pressure of the pressure medium activation device is used to adapt the actuator position or the clutch characteristic curve.

10 Claims, 5 Drawing Sheets

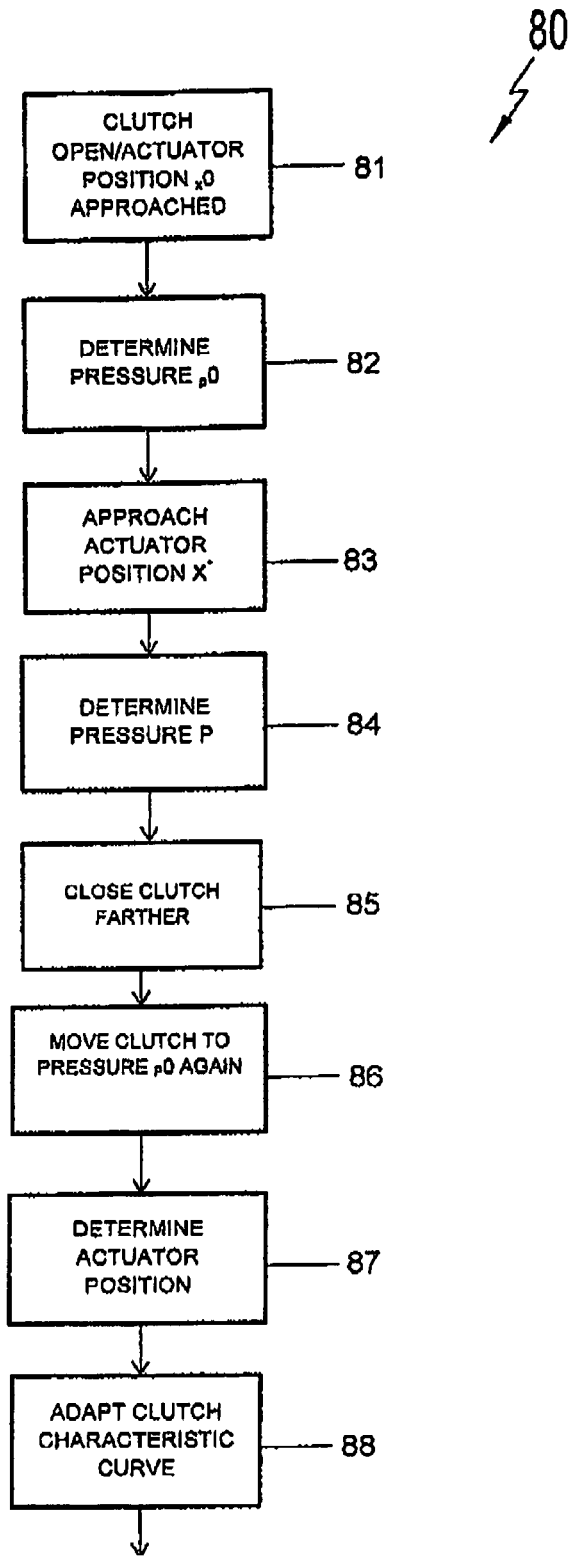

METHOD FOR ADAPTING A CLUTCH

CROSS REFERENCE TO RELATED APPLICATIONS

This application claims priority under 35 USC 119 to German Patent Appl. No. 10 2012 103 408.7 filed on Apr. 19, 2012, the entire disclosure of which is incorporated herein by reference.

BACKGROUND

1. Field of the Invention

The invention relates to a method for adapting a clutch.

2. Description of the Related Art

Vehicles with a parallel hybrid drive have an internal combustion engine and an electric motor arranged on one shaft in the drive train. Either the internal combustion engine or the electric motor or both machines can be used to drive the vehicle. A clutch is provided between the internal combustion engine and the electric motor. The clutch is disengaged in a purely electrical driving mode so that the internal combustion engine can be switched off and the vehicle can be driven by the electric motor. Engagement of the clutch enables the internal combustion engine to transmit a torque to the drive train and drive it. This can take place with a driving electric motor or with a freely rotating electric motor.

The connection of the internal combustion engine following pure electric operation should not be perceived as disruptive to passengers in the vehicle. For example, the connection of the internal combustion engine should not result in a jolt caused by suddenly increased torques or suddenly reduced torques. The connection only starts as a result of the tow starting of the internal combustion engine. Thus, a portion of the torque available for the propulsion would be branched off suddenly and used for tow starting the internal combustion engine. This reduction in torque for propulsion would be perceptible even in the case of only partially closing the clutch unless there is an additional increase in torque. An additional torque could be made available by the electric motor. However, the closing of the clutch must be controlled so that the actual additional torque is used only for the tow starting of the internal combustion engine and therefore no jolt occurs.

The torque that can be transmitted by the clutch is determined by a clutch characteristic curve. The characteristic curve can be shifted or distorted during operation due to thermal changes and mechanical tolerances. Therefore, a resulting transmissible torque when the clutch is engaged may not correspond to the expected transmissible torque. Jolts may be experienced when the internal combustion engine is tow started if the torque transmitted by the clutch does not correspond to the intended transmissible torque. The clutch position itself typically is not detected, but instead a position of the master cylinder of the actuator or some other position of the actuator is detected. As a result, a difference can occur between the actuator position and the actual clutch position. This difference may be caused, for example, by thermal effects. The thermal shifting causes the clutch position that occurs to differ from the clutch position that is expected.

For this reason, an ability to detect or determine as precisely as possible the torque that can be transmitted by the clutch is of decisive importance for the quality of the connection of the internal combustion engine in vehicles with a parallel hybrid drive.

The object of the invention is to provide a method for adapting the torque that can be transmitted by the clutch and that permits the torque that can be transmitted by the clutch to be determined precisely despite thermal changes or other tolerances are present.

SUMMARY OF THE INVENTION

The invention relates to a method for adapting the torque that can be transmitted by a clutch of a motor vehicle that has an internal combustion engine and an electric motor for driving. The clutch has a pressure medium activation device that is driven by an actuator and has a pressure medium link between a master cylinder and a slave cylinder for activating the clutch. An adaptation of the torque that can be transmitted by the clutch takes place in a disengaged clutch position in that a change in the predefinable actuator position x at a given determinable pressure p of the pressure medium activation device is used to adapt the actuator position x or the clutch characteristic curve. This ensures that, with the same pressure value p0, the change in the actuator position is fed back to a thermal effect or some other effect that can be corrected so that when the pressure is the same the same actual clutch position can also be set.

The actuator position advantageously is predefined by activation of the activator, and a resulting pressure value p occurs, which is determined, for example, by a pressure sensor.

A setpoint pressure p0 of the pressure medium of the pressure medium activation device preferably is defined starting at a predefined opened actuator position x0. After further activation of the clutch from the predefined actuator position x0 into another actuator position x* and subsequent setting of an actuator position with the previously defined setpoint pressure p0, the associated actuator position xN is determined and is compared with the predefined actuator position x0. The change in the actuator position (x0-xN) is used to adapt the actuator position or the clutch characteristic curve.

The predefined actuator position x0 preferably is a position in the opened state of the clutch and the pressure p0 of the pressure medium is determined. The clutch then is closed further to the actuator position x* and a pressure p* is determined. Subsequently the clutch is closed further to the actuator position x1 and a pressure p1 is determined. The clutch then is opened further again to reach the pressure p0. The value of the actuator position xN associated with the pressure p0 is determined and is compared with the predefined actuator position x0. The change in the actuator position (x0-xN) is used to adapt the actuator position or the clutch characteristic curve. In this context, the opened position of the clutch is a position with a reduced transmissible torque. The transmissible torque advantageously is equal to 0. It is advantageous if during or after the position x* is approached from the position x0, the gradient of the pressure/travel characteristic curve is determined in the region x0-x*. As a result, plausibility checking can be carried out in such a way that the hysteresis branch is identified along which the activation of the actuator moves, permitting the pressure value p0 to be found more easily.

It is particularly advantageous if x* is greater than x0, and x1 is smaller than x0, with the result that x0 and x* lie on the same hysteresis branch of the clutch characteristic curve, and x1 lies on a different hysteresis branch of the clutch characteristic curve. In this context, x0 and x* lie on the hysteresis branch of the opening clutch and x1 lies on the hysteresis branch of the closing clutch.

In another embodiment of the invention if x* is smaller than x0, and x1 is greater than x0, with the result that x0 and x* lie on the same hysteresis branch of the clutch characteristic curve, and x1 lies on a different hysteresis branch of the clutch characteristic curve. In this context, x0 and x* lie on the hysteresis branch of the closing clutch, and x1 lies on the hysteresis branch of the opening clutch.

The adaptation preferably is carried out in an operating situation if the clutch is disengaged to such an extent that the slave cylinder of the pressure medium activation device has arrived at a mechanical stop position.

The adaptation may be carried out in an operating situation when the clutch is between an engaged and a completely disengaged position.

It is expedient if the clutch is in a clutch position in which no torque is transmitted.

The method for adaptation preferably is carried out during operation of the vehicle in predefinable operating situations.

The method for adaptation preferably is carried out at the belt end when the vehicle is put into operation.

Further advantageous refinements are described by the following description of the figures and by the dependent claims.

The invention will be explained below in more detail on the basis of at least one exemplary embodiment and with reference to the drawings.

BRIEF DESCRIPTION OF THE DRAWINGS

FIG. 5 shows a diagram.

DETAILED DESCRIPTION OF THE PREFERRED EMBODIMENTS

Figure 1:
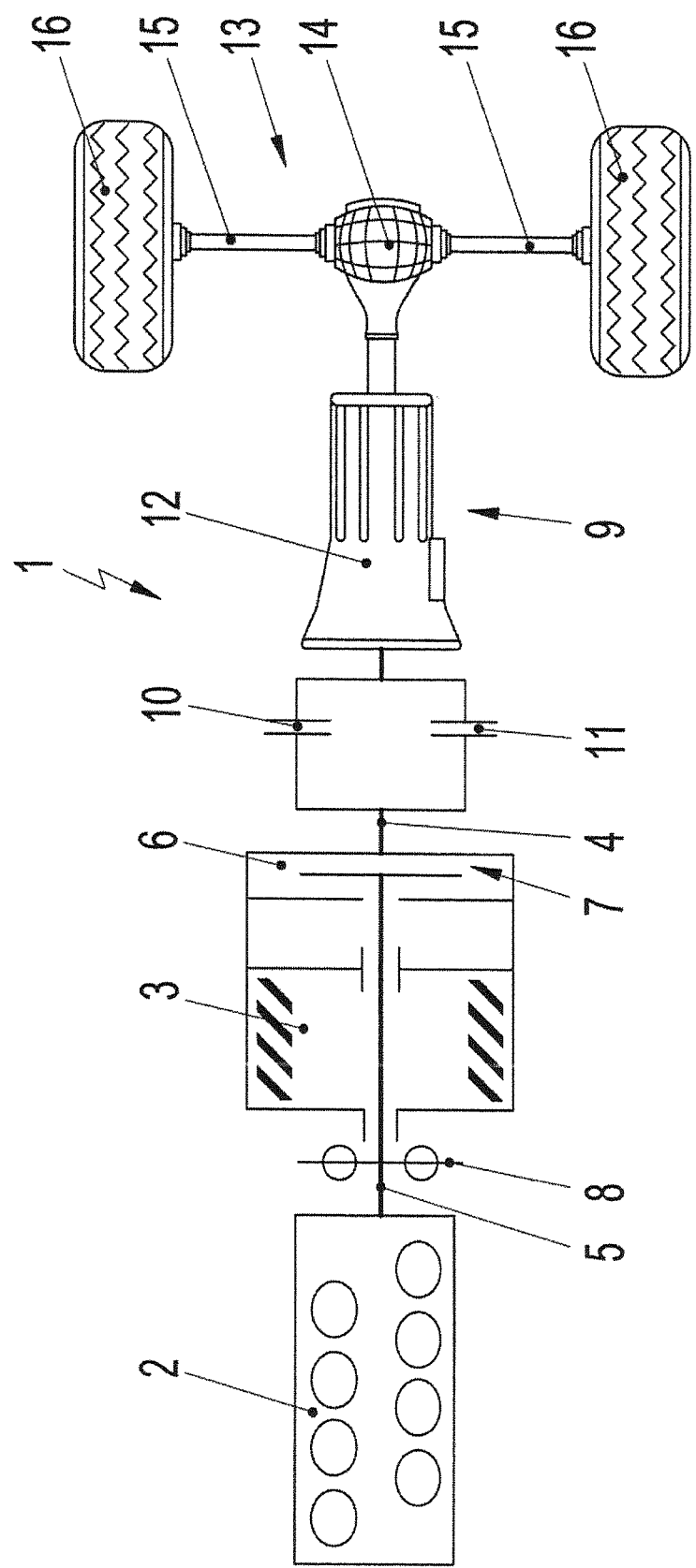
FIG. 1 shows a schematic view of a motor vehicle with an internal combustion engine and with an electric motor.

FIG. 1 is a schematic view of a motor vehicle 1 having a parallel hybrid drive arrangement with an internal combustion engine 2 and an electric motor 3. The internal combustion engine 2 and the electric motor 3 are arranged on a common shaft 4 so that the output shaft 5 of the internal combustion engine 2 and the output shaft 6 of the electric motor 3 transmit torque to the same shaft 4.

A damper 8, such as a two-mass flywheel, advantageously is provided between the internal combustion engine 2 and the clutch 7. However, the damper 8 can be omitted or can be arranged elsewhere in the drive train.

A clutch 7 is between the internal combustion engine 2 and the electric motor 3 and can connect the output shaft 5 of the internal combustion engine 2 to the output shaft 6 of the electric motor 3 in a torque-transmitting fashion. In the disengaged state, the clutch 7 is open and does not transmit any torque from the internal combustion engine 2 to the shaft 4. If the clutch is engaged, the torque that can be transmitted by the clutch 7 can be controlled in a modulated fashion. The transmissible torque can be modulated, for example, by controlling pressure of a clutch plate in the clutch between the pressure plate and the clutch housing to allow a slip or a transmissible torque to be selectively set.

A double clutch transmission 9 is arranged downstream of the electric motor 3 in the torque flux and has two clutches 10, 11 and a transmission 12 relating thereto. The transmission 12 is illustrated only schematically. A further drive train 13 with differential 14 and axles 15 and driven wheels 16 is downstream of the transmission.

Figure 2:
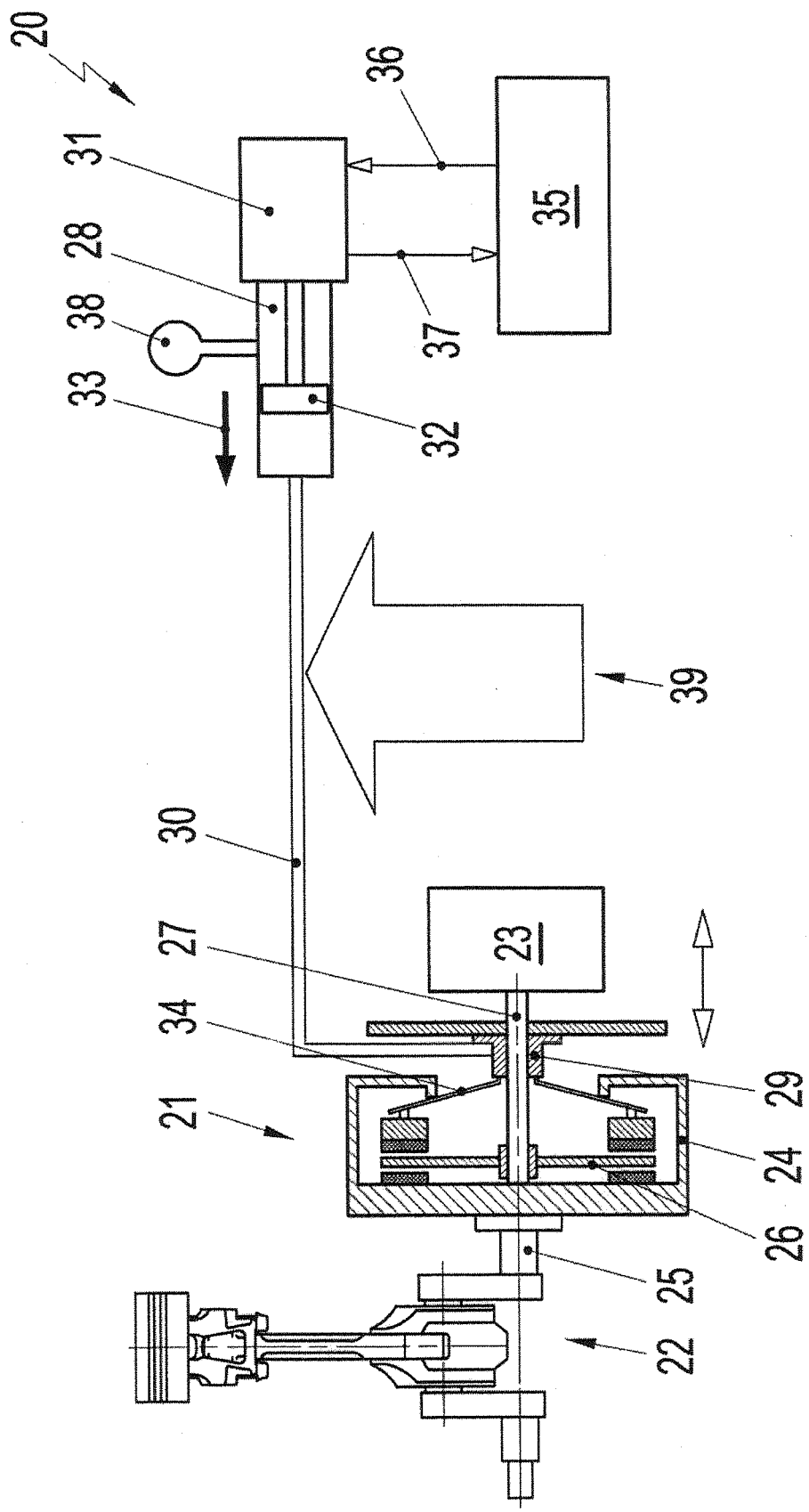
FIG. 2 shows a schematic view of an activation device for a clutch in the drive train of the motor vehicle.

FIG. 2 shows a pressure medium activation device 20 for activating a clutch 21 in the drive train of a motor vehicle for connecting an internal combustion engine 22 to an electric motor 23. In this context, the clutch housing 24 is connected to the crankshaft 25 of the internal combustion engine 22, and the clutch plate 26 is connected via a shaft 27 to the electric motor 23.

The pressure medium activation device 20 can activate the clutch 21 to set the torque that can be transmitted by the clutch 21. The pressure medium activation device 20 has a clutch master cylinder 28 and a clutch slave cylinder 29, which is a concentric slave cylinder (CSC) in the embodiment in FIG. 2. A pressure medium line 30 is arranged between the master cylinder 28 and slave cylinder 29 to apply pressure medium to the slave cylinder 29 from the master cylinder 28. More particularly, an actuator 31 can be activated to shift a piston 32 in the axial direction shown by arrow 33, and this acts on the piston in the concentric slave cylinder 29 to activate the tongues 34 of the clutch 21 by means of a release bearing.

The control of the actuator 31 is carried out by a control unit 35 which, according to the arrow 36, predefines a setpoint travel or a setpoint position of the piston 32 in the clutch master cylinder. The actual value of the position or of the travel of the piston of the clutch master cylinder is fed back to the control unit 35, as indicated by the arrow 37. An equalizing reservoir 38 equalizes pressure medium downstream of an open position of the equalizing container in a method of the piston 32. In this context, the clutch position is a function of the position of the clutch slave cylinder, and the actuator position is a function of the position of the clutch master cylinder.

The arrow 39 indicates that various influencing variables such as the temperature, aging, air influences and degradation of the pressure medium can influence the pressure medium activation device, causing, for example, thermal expansion of the pressure medium, such as can be found, for example, with a hydraulic fluid. These variables have the effect that, even with a constant clutch master cylinder position, the clutch slave cylinder position still changes. Thus, the desired clutch position relating to the desired torque that can be transmitted by the clutch is not set, but instead is a value that is falsified according to the clutch characteristic curve.

Desirably, any given setting of the clutch master cylinder position should result in a corresponding torque that can be transmitted by the clutch or a corresponding clutch slave cylinder position. Thus, the pressure medium activation system must adapt so that, when a predefinable value of the actuator position is set, the actual intended value of the transmissible torque of the clutch also is set.

Figure 3:
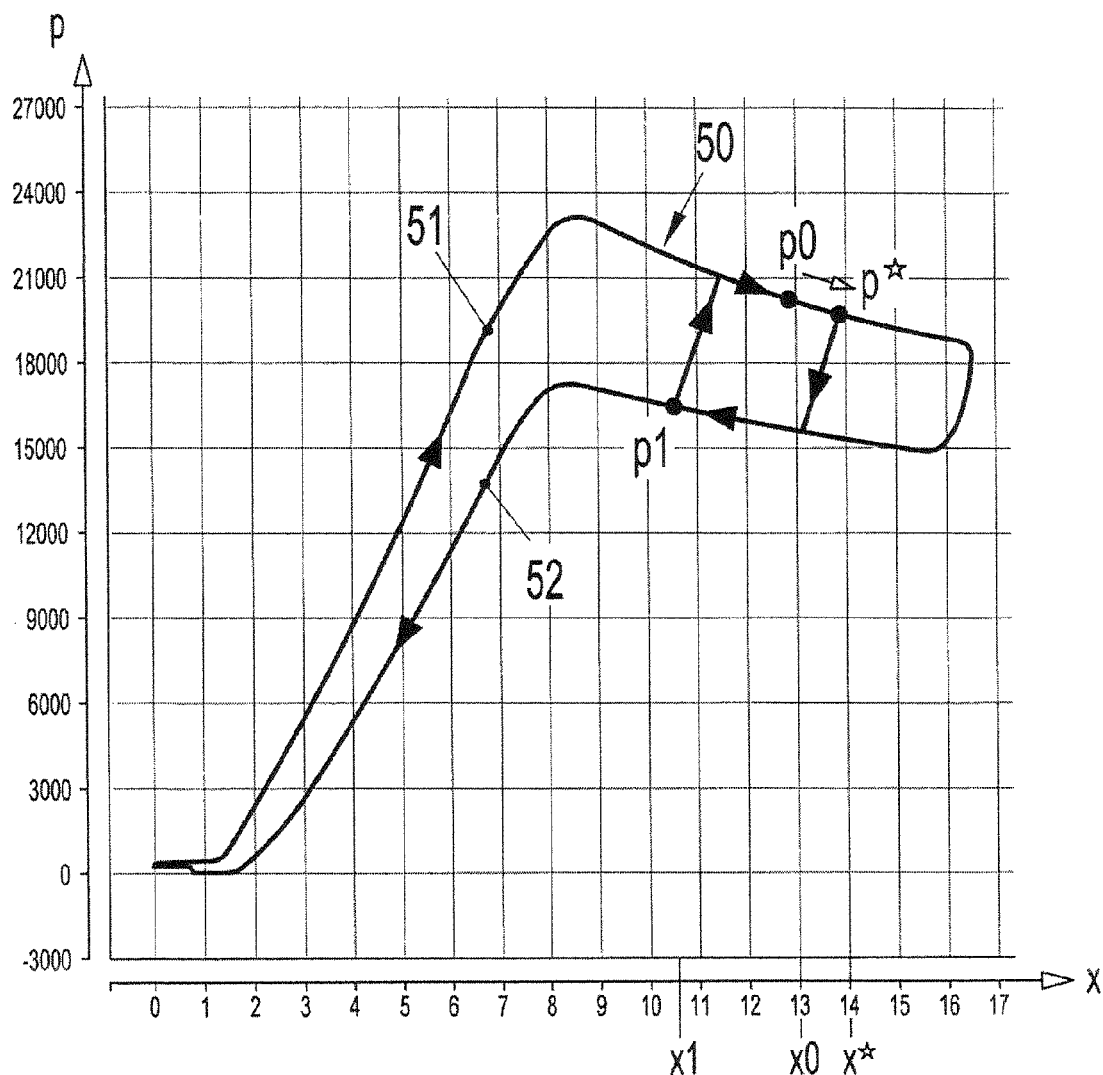
FIG. 3 shows a clutch characteristic curve.

FIG. 3 is a clutch characteristic curve on which the pressure p in the pressure medium activation device is plotted as a function of the actuator position x.

As is apparent, the characteristic curve 50 is subjected to hysteresis and has a first hysteresis branch 51 with an increasing actuator activation travel x and a second hysteresis branch 52 with a decreasing actuator activation travel x.

The adaptation of the clutch characteristic curve 50 takes place in a first embodiment so that the clutch is set to a disengaged position, and a change in the actuator position at a given pressure p of the pressure medium activation device is used to adapt the actuator position and/or the clutch characteristic curve.

In this context, the method starts at a predefined opened clutch position with a corresponding actuator position x0. The pressure value p0 assigned to the actuator position x0 is determined. The clutch then is activated by activating the actuator from the actuator position x0 to another actuator position x*, and a pressure value p* relating to the actuator position x* is stored and a renewed setting of the value p0 subsequently takes place. The value of the actuator position xN that is associated with the value p0 then is determined and the value of the actuator position and/or the clutch characteristic curve which is to be adapted from the difference x0-xN is used. Stated simply, the characteristic curve can be shifted by the difference x0-xN.

For this purpose, starting from the value x0 at the pressure value p0, the clutch is opened further as far as a value x*. Subsequently, the pressure p* is determined and stored. The clutch then is closed further. As a result, there is a changeover from the hysteresis branch 51 to the hysteresis branch 52, wherein as far as a pressure value P1 and an associated value x1 the clutch is opened or opened less. In this context, it is advantageous if the value p1 lies sufficiently below the value p0 that the value x1 certainly lies below the value of x0. The clutch then is opened again until a further changeover occurs from the hysteresis branch 52 to the hysteresis branch 51, and then a pressure value of P0 is set. The resulting clutch position xN is subsequently used to adapt the clutch again. In this context, slow adjustment movement of the actuator position from the value x1 in the direction of a value x* is performed to ensure that the correct hysteresis branch is moved along in order to move in the direction x* until the value p0 is reached again. This movement advantageously is actuated cyclically.

Figure 4:
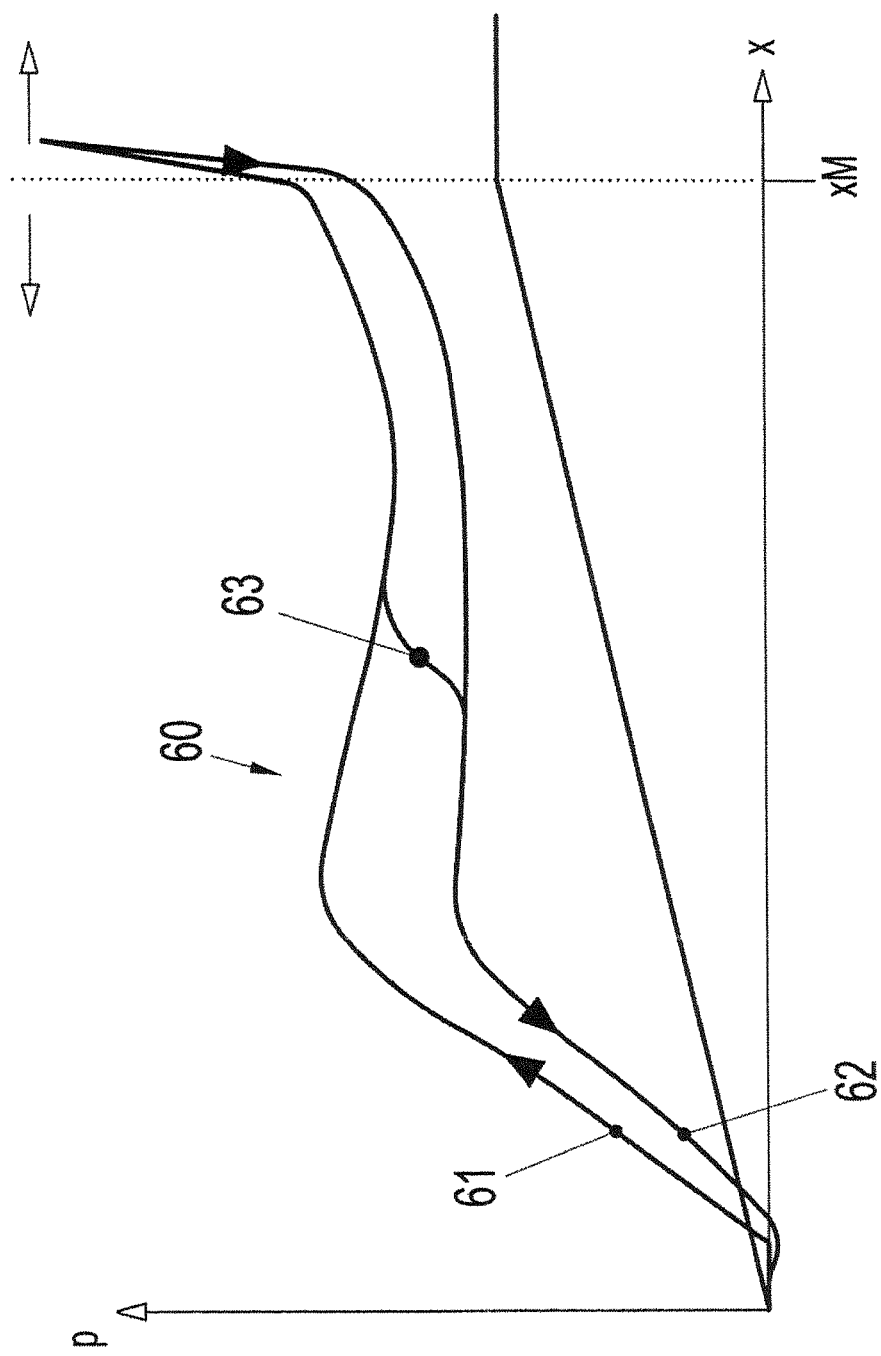
FIG. 4 shows a clutch characteristic curve.

FIG. 4 shows a further embodiment of the invention with a clutch characteristic curve 60 that plots pressure p is again plotted against the travel x. The clutch characteristic curve 60 has a first hysteresis branch 61 for the disengagement movement of the clutch and a second hysteresis branch 62 for the engagement of the clutch.

As is apparent, the clutch characteristic curve between the value 0 and the value xM is essentially known and comparable with the characteristic curve of FIG. 3. The working point 63 for adapting the clutch characteristic curve of FIG. 4 is arranged essentially in the center of the diagram.

For actuator positions greater than xM, the actuator of the activation device, which may be a spindle actuator, is extended to such an extent that the slave cylinder, preferably a concentric slave cylinder, is against its mechanical stop. Starting from this point, the mechanical hysteresis of the clutch no longer has any influence on the travel/pressure behavior of the system, and the pressure then is dependent only on the travel of the actuator and on the rigidity of the pressure medium line or hydraulic line.

If the actuator is moved further in this situation, a steeper pressure buildup will take place since the pressure p acts only against the expansion of the hydraulic line. If a working point then is set in the region of a value of a clutch activation position that is greater than xM, the gradient of the characteristic curve is approximately 8 to 10 times steeper than in the normal activation range and expansion of the hydraulic fluid or pressure medium therefore brings about a greater pressure dependence, causing the changes in the travel of the actuator position to be clearly apparent and allowing them to be adapted and corrected more precisely. Accordingly, the clutch characteristic curve can be adapted even in a region in which the slave cylinder has already arrived at a mechanical stop.

FIG. 5 is a block circuit diagram 80 that illustrates the adaptation method.

Block 81 indicates that the value of the actuator position of x0 is approached with the clutch in a disengaged position. The pressure p0 then is determined at block 82. Alternatively, the actuator position x can also be actuated under pressure control to reach a setpoint pressure p0.

The actuator position x0 then can be kept the same, and by changing the pressure value from p0 to another value p**, a change in the pressure medium system can be inferred. The actuator position x then can be changed from x0 to xN to obtain the same pressure value p0 again. The value xN of the actuator position or the difference (x0-xN) is then set and can then be used to adapt the clutch characteristic curve.

Alternatively, starting from the position x0 it is possible to approach the position x* in block 83. Subsequently, the pressure p* in block 84 is determined. Then, in block 85 the clutch is closed further. As a result, there is a changeover from the hysteresis branch 51 to the hysteresis branch 52, and the clutch is opened up to a pressure value P1 and an associated value x1. The clutch is closed again in block 86 and a pressure value of p0 is set. The resulting clutch position xN is determined in block 87, and subsequently used to adapt the clutch in block 88.

What is claimed is:

1. A method for adapting torque that can be transmitted by a clutch of a motor vehicle having an internal combustion engine and an electric motor for driving, having a pressure medium activation device that is driven by an actuator and has a pressure medium link between a master cylinder and a slave cylinder for activating the clutch, the method comprising: disengaging the clutch to achieve a first predefinable actuator position; determining a first pressure of the pressure medium activation device at the first actuator position; changing the actuator position to a second actuator position; determining a second pressure of the pressure medium activation device at the second actuator position; changing the actuator position until the first pressure of the pressure medium activation device is re-achieved; determining a final actuator position when the first pressure of the pressure medium activation device is re-achieved; comparing the first and final actuator position; and adapting a clutch characteristic curve in accordance with any difference determined when comparing the first and final actuator positions.

2. The method of claim 1, wherein the first actuator position is a position in an opened state of the clutch, the method further comprising opening the clutch further to an intermediate actuator position; determining a pressure at the intermediate actuator position, subsequently closing the clutch to achieve the second actuator position; and opening the clutch again to reach the first pressure.

3. The method of claim 2, wherein a value of the intermediate actuator position is greater than a value of the first actuator position, a value of the second actuator position is smaller than the value of the first actuator position, with the first and intermediate actuator positions lying on one hysteresis branch of the clutch characteristic curve, and the second actuator position lying on a different hysteresis branch of the clutch characteristic curve.

4. The method of claim 2, wherein the value of the Intermediate actuator position is smaller than the value of the first actuator position, the value of the second actuator position, is greater than the value of the first actuator position, with the first and intermediate actuator positions lying on one hysteresis branch of the clutch characteristic curve, and the second actuator position lying on a different hysteresis branch of the clutch characteristic curve.

5. The method of claim 1, further comprising carrying out the adapting of the clutch characteristic curve in accordance with any difference determined when comparing the first and final actuator positions in an operating situation if the clutch is disengaged sufficiently that the slave cylinder of the pressure medium activation device has arrived at a mechanical stop position.

6. The method of claim 1, further comprising carrying out the adapting of the clutch characteristic curve in accordance with any difference determined when comparing the first and final actuator positions in an operating situation when the clutch is between an engaged and a completely disengaged position.

7. The method of claim 6, wherein the adapting the clutch characteristic curve in accordance with any difference determined when comparing the first and final actuator positions is carried out when the clutch is in a clutch position in which no torque is transmitted.

8. The method of claim 1, wherein the method is carried out for adapting the clutch characteristic curve in accordance with any difference determined when comparing the first and final actuator positions during operation of the vehicle in predefinable operating situations.

9. The method of claim 1, wherein the method is carried out for adapting the clutch characteristic curve in accordance with any difference determined when comparing the first and final actuator positions at a belt end when the vehicle is put into operation.

10. The method of claim 1, wherein each of the method steps are repeated cyclically for periodically determining a heed for adapting the clutch characteristic curve.

* * * * *